United States Patent
Wu et al.

(10) Patent No.: US 9,308,579 B2
(45) Date of Patent: Apr. 12, 2016

(54) CALCIUM OXIDE-BASED CERAMIC CORE AND PREPARATION METHOD THEREOF

(71) Applicant: BEIHANG UNIVERSITY, Beijing (CN)

(72) Inventors: Guoqing Wu, Beijing (CN); Pengpeng Zhou, Beijing (CN); Jiaqi Zhao, Beijing (CN); Hai Nan, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 14/374,919

(22) PCT Filed: May 31, 2013

(86) PCT No.: PCT/CN2013/076526
§ 371 (c)(1),
(2) Date: Jul. 28, 2014

(87) PCT Pub. No.: WO2014/063491
PCT Pub. Date: May 1, 2014

(65) Prior Publication Data
US 2015/0239037 A1    Aug. 27, 2015

(30) Foreign Application Priority Data

Oct. 25, 2012  (CN) .......................... 2012 1 0413062
Oct. 25, 2012  (CN) .......................... 2012 1 0413334

(51) Int. Cl.
*B22C 9/10*    (2006.01)
*C04B 35/057*  (2006.01)
*C04B 35/628*  (2006.01)
*B22C 1/00*    (2006.01)

(Continued)

(52) U.S. Cl.
CPC ... *B22C 9/10* (2013.01); *B22C 1/00* (2013.01); *B22C 1/22* (2013.01); *B22D 21/022* (2013.01);
(Continued)

(58) Field of Classification Search
CPC .......................................................... B22C 9/10
USPC ................. 164/369, 520, 529; 106/38.2–38.9
See application file for complete search history.

(56) References Cited

U.S. PATENT DOCUMENTS 4,787,439 A * 11/1988 Feagin .................... B22C 1/00
                                                    106/38.3
5,535,811 A *  7/1996 Feagin .................... B22C 1/00
                                                    106/38.22

(Continued)

FOREIGN PATENT DOCUMENTS

| CN | 1793033 A * | 6/2006 |
| CN | 102531584 A | 7/2012 |
| CN | 102557622 A | 7/2012 |

OTHER PUBLICATIONS

EPO machine translation of CN 1793033 A, Jun. 2006.*

*Primary Examiner* — Kevin E Yoon
(74) *Attorney, Agent, or Firm* — Pai Patent & Trademark Law Firm; Chao-Chang David Pai

(57) ABSTRACT

This invention publishes a method to prepare CaO-based ceramic cores used in investment casting applications. This method claims to use the rare earth oxide to coat the CaO core surface; later the coated cores are shaped then sintered to get the final products. CaO based core was made by 5~15 wt % plasticizer, 0.001~20 wt % mineralizer and the rare earth-coated CaO powders to balance for total 100%. This preparation method can solve the CaO core water absorption problems during core manufacturing, shipping and storage process while improve the core chemical inertness and mechanical properties.

13 Claims, 2 Drawing Sheets

(51) Int. Cl.
*B22C 1/22* (2006.01)
*B22D 21/02* (2006.01)
*C04B 35/622* (2006.01)
*C04B 35/634* (2006.01)

(52) U.S. Cl.
CPC ............ *C04B 35/057* (2013.01); *C04B 35/622* (2013.01); *C04B 35/62815* (2013.01); *C04B 35/634* (2013.01); *C04B 2235/3224* (2013.01); *C04B 2235/3225* (2013.01); *C04B 2235/3244* (2013.01)

(56) References Cited

U.S. PATENT DOCUMENTS

| | | | | |
|---|---|---|---|---|
| 5,712,435 | A * | 1/1998 | Feagin | B22C 1/00 106/38.22 |
| 5,944,088 | A * | 8/1999 | Feagin | B22C 1/00 106/38.22 |
| 8,002,017 | B2 * | 8/2011 | Hayashi | B22C 9/105 164/519 |
| 2009/0088312 | A1 | 4/2009 | Umekawa et al. | |

* cited by examiner

CALCIUM OXIDE-BASED CERAMIC CORE AND PREPARATION METHOD THEREOF

TECHNICAL FIELD

This invention relates to a method to prepare CaO-based ceramic core for titanium investment casting.

TECHNICAL BACKGROUND

Ceramic cores are used in investment casting process to achieve complicated internal structures. They will be removed when casting are finished. The processes are: preparation cores, preparation wax pattern, preparation shells, removal the wax in shells, shell sintering, casting alloys, remove cores. With the launch of large aircraft project and the new engine development projects, more and more titanium components with complicated structure were designed to save component weight while have good integrity. Hence cores with excellent mechanical and removal properties were highly needed.

Nowadays, the widely used core materials such as alumina-based and silica-based are not suitable used in titanium investment casting due to the heavy metal/core interaction during casting process. Meanwhile, they are very difficult to take out from castings after metal solidification. Due to the excellent chemical inertness between CaO material and titanium, it attract many researchers attention. Chinese patent CN 102531648 A describes a method to prepare CaO-based ceramic core used in titanium investment casting. The core consists of 1.0~15 wt % zirconia, 0.5~10.0 wt % yttria, 0.05~0.1 wt % thoria, with CaO for balance. By simply calculating, the CaO-based ceramic core in this patent contains of 74.9~98.45 wt % CaO. Normally, the preparation time for core is about 2 weeks, and during the manufacturing process, CaO will contact or absorb the water from the environment. During this time, CaO in cores are easily absorbed or contacted with water from the environment and lead to CaO cores collapsed, therefore, it is not suitable to use in actual investment casting applications. Chinese patent CN 1793033 A claims a method to prepare the ceramic cores for titanium investment casting, which consists of 60~85 wt % zirconia and 4~20 wt % calcium oxide. As it was known, there're several ways to remove the cores inside the castings such as mechanical force, chemical corrosion, and the combination of both. Usually, for very complicated structures, chemical corrosion is the most effective way to remove core in castings. However, $ZrO_2$ is hardly dissolved in acid or alkali solution, therefore, it is very difficult to remove from castings. Because of the complicated and time-consumed titanium investment casting process, cores are very easy to contact water. In order to solve CaO core water absorbance, it's necessary to develop a water-resistant CaO-based ceramic core.

CONTENTS OF THE INVENTION

This invention aims to provide manufacturing method to prepare a water resistant CaO-based ceramic core for titanium investment casting. The core consists of 5~15 wt % plasticizer, the rest part is rare earth oxides coated CaO powder, the sum of the two parts mentioned above is 100%. Besides, there could be 0.01~20 wt % mineralizer in addition.

The mineralizer is made of $ZrO_2$, $Y_2O_3$ or $ZrO_2$ & $Y_2O_3$ mixture powder in any percent.

The plasticizer is made of 50~80 wt % paraffin wax, 10~40 wt % beeswax, 5~10 wt % oleic acid.

The method to prepare the CaO-based ceramic core includes following steps:

Step 1, prepare rare earth oxides coated CaO powder:

First, prepare the CaO suspension. Add the non-ionic surfactant to ethanol to get the mixed solution, make sure every 10 L ethanol contain 0.1~1 kg non-ionic surfactant.

Add the CaO powder into the solution to form a suspension.

Second, prepare the rare earth oxides precursor. Mix the zirconium oxychloride and inorganic yttrium salt in any percentage to form the rare earth oxides precursor. Weight the zirconium oxychloride and inorganic yttrium salt. Put them into the ethanol and heat the solution, then add hydrogen peroxide into the solution.

Sufficiently stir solution to form the rare earth oxides precursor No 1 solution.

Third, add the rare earth oxides precursor solution into the CaO suspension, and stir them to attain NO. 2 mixed solution.

Fourth, add the ammonia water solution into NO. 2 solution to adjust pH value to 8~11, and attain NO. 3 mixed solution.

Fifth, dry the NO. 3 mixed solution to get the powders.

Sixth, sinter the powders at the temperature 500~1600° C., 0.5~20 h to get the rare earth oxides-coated CaO powders.

The CaO amount mentioned above is 1~20 kg in 10 L ethanol.

The non-ionic surfactant mentioned above could be one of PEG, AEO, carbon-rich AEO, polyoxyethylene fatty acid, polyoxyethylene amine, polyoxyethylene amide.

The inorganic yttrium salt could be yttrium chloride or yttrium nitrate.

The amount of $H_2O_2$ is 0.1~0.5 kg in per 10 L the rare earth oxides precursor solution.

The concentration of rare earth oxides precursor solution is 0.01~22 mol/L.

The NO. 2 mixed solution, the mole ratio of rare earth oxides and CaO is 0.005~9.5.

Step 2, stirring while heating the rare earth oxides-coated CaO powders with plasticizer to 50~130° C. to make rare earth oxides-coated CaO-based ceramic cores; stirring while heating rare earth oxides-coated CaO powders, plasticizer and mineralizer to 50~130° C. to make rare earth oxides-coated CaO-based ceramic cores.

Step 3, shaping then sintering rare earth oxides-coated CaO-based ceramic cores with sintering temperature at 1100~1600° C. for 0.5~20 hrs.

The cores prepared by this patent are water-resistant, easy-made and low-priced, and it's suitable to be used in industry.

DESCRIPTIONS OF THE FIGURES

MODE OF CARRYING OUT THE INVENTION

Example 1

Preparation Rare Earth Oxides-Coated CaO Cores in this Invention as Following Steps The 1st step, prepare the suspension of CaO powders. Add 0.1 kg PEG into the ethanol to form the NO. 1 solution. Add 1 kg CaO into the NO. 1 solution, and stir them to get the CaO suspension.

The 2nd step, prepare the rare earth oxides precursor. Mix the zirconium oxychloride with ethanol and heat the solution. Then, add 25 wt % hydrogen peroxide solution into the solution, stir them to get the zirconium oxychloride precursor with concentration of 22 mol/L.

The 3rd step, add the zirconium oxychloride precursor into CaO suspension, stir them to get NO. 2 solution. The mole ratio of the zirconium oxychloride and the CaO is 9.5:1.

The 4th step, use ammonia water solution to adjust the pH value of NO. 2 solution to 8 to get NO. 3 solution.

The 5th step, dry the NO. 3 solution to get the powders. The condition for drying is 80° C. for 9 hours.

The 6th step, sinter the powders at 500° C. for 2 hrs. Attain 20.866 kg rare earth oxides-coated CaO powders.

The 7$^{th}$ step, heat the 20.866 kg rare earth oxides-coated CaO powders, 0.062 kg zirconia, 0.549 kg paraffin wax, 0.439 kg beeswax and 0.110 kg oleic acid mixture to 50° C., then stirring them sufficiently to get the CaO-based ceramic cores material.

The 8$^{th}$ step, shape the material and sinter it to produce the CaO-based ceramic cores. Sintering condition is 1100° C. for 0.5 hrs.

The room and high temperature bending strength test results of cores are: bending strength at room temperature is 40 MPa, and at high temperature is 15 MPa; at 1500° C., the core deflection is 0.1 mm, 0.4% sintering shrinkage; 40% porosity; Hydration test is operated in a chamber at 26° C. and 98% humidity for 1, 5, 10, 15, 20 days, then weight the ceramic core tablets, record the weight changes.

TABLE 1

| the consequence of the hydration test | | | | | |
|---|---|---|---|---|---|
| time/day | 1 | 5 | 10 | 15 | 20 |
| Weight gain rate/% | 0.037 | 0.046 | 0.078 | 0.083 | 0.11 |

Figure 1:
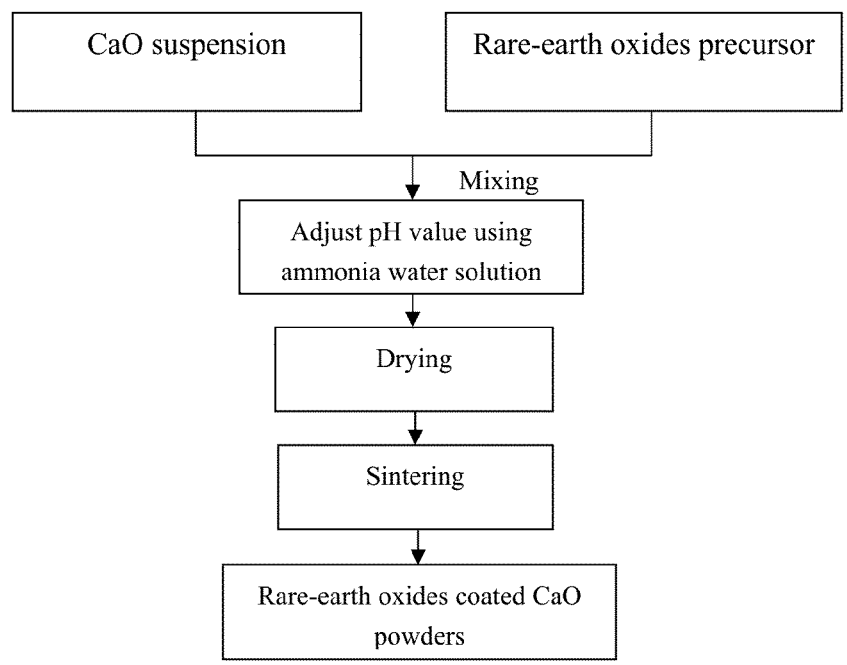
FIG. 1 is the flow chart of the preparation process of the rare earth oxides-coated CaO powders.
Figure 2:
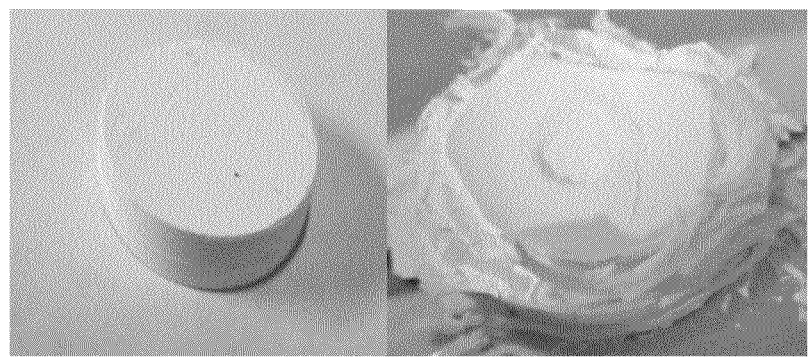
FIG. 2 shows the structure of the CaO cores before and after the hydration test.
Figure 3:
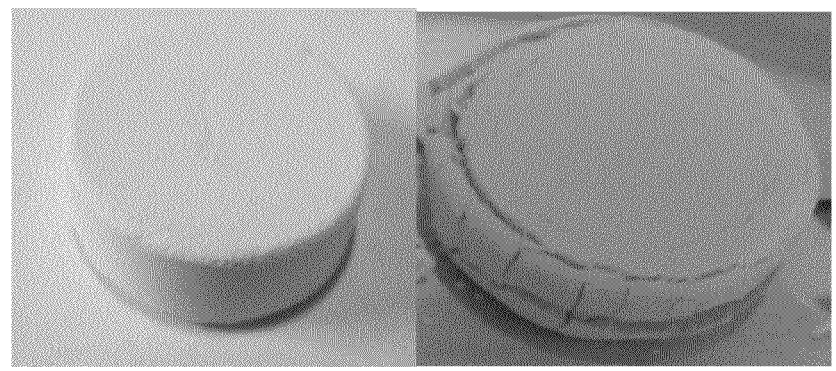
FIG. 3 shows the structure of the rare earth oxides-coated CaO cores before and after the hydration test.

From the table 1, the weight gain rate of the rare earth coated CaO-based water-resistant ceramic cores after 20 days is only 0.11%, which shows the superior water resistance and meet the requirements for titanium investment casting. As we can see from the FIG. 2 and FIG. 3, the rare earth oxides-coated CaO cores can withstand the 100° C. water vapor temperature with only 10 minutes; compare with pure CaO cores quickly react with water and lose its original shape, the rare earth oxides-coated CaO cores water resistant property were largely improved.

Example 2

Prepare the Rare Earth Oxides-Coated CaO Cores in this Invention Instructs as Following Steps The 1st step, prepare the suspension of CaO powders. Add 1 kg polyoxyethylene amine into 10 L ethanol to form the NO. 1 solution. Add 20 kg CaO into the NO. 1 solution, and stir them to get the CaO suspension.

The 2nd step, prepare the rare earth oxides precursor. Mix the yttrium chloride with ethanol and heat the solution. Then, add 20 wt % hydrogen peroxide solution into the solution, stir them to get the yttria precursor with concentration of 0.01 mol/L.

The 3rd step, add the yttria precursor into CaO suspension, stir them to get NO. 2 solution. The mole ratio of the yttrium chloride and the CaO is 0.005:1.

The 4th step, use ammonia water solution to adjust the pH value of NO. 2 solution to 11 to get NO. 3 solution.

The 5th step, dry the NO. 3 solution to get the powders. The condition for drying is 100° C. for 10 hours.

The 6th step, sinter the powders at 1600° C. for 0.5 h. Attain 20.202 kg yttria-coated CaO powders.

The 7$^{th}$ step, heat the 20.202 kg yttria-coated CaO powders, 6.216 kg zirconia, 3.73 kg paraffin wax, 0.466 kg beeswax and 0.466 kg oleic acid mixture to 120° C., then stirring them sufficiently to get the CaO-based ceramic cores material.

The 8$^{th}$ step, shape the material and sinter it to produce the CaO-based ceramic cores. Sintering condition is 1400° C.

The room and high temperature bending strength test results of cores are: bending strength at room temperature is 38 MPa, and at high temperature is 13 MPa; at 1500° C., the core deflection is 0.11 mm, 0.23% sintering shrinkage; 33% porosity; Hydration test is operated in a chamber at 26° C. and 98% humidity for 1, 5, 10, 15, 20 days, then weight the ceramic core tablets, record the weight changes.

TABLE 2

| the consequence of the hydration test | | | | | |
|---|---|---|---|---|---|
| time/day | 1 | 5 | 10 | 15 | 20 |
| Weight gain rate/% | 0.019 | 0.026 | 0.035 | 0.042 | 0.067 |

From the table 2, the weight gain rate of yttria-coated CaO-based water-resistant ceramic cores after 20 days is only 0.067%, which shows the superior water resistance and meet the requirements for titanium investment casting.

Example 3

Prepare the Rare Earth Oxides-Coated CaO Cores in this Invention Instructs as Following Steps The 1st step, prepare the suspension of CaO powders. Add 0.5 kg Polyoxyethylene fatty acid into 10 L ethanol to form the NO. 1 solution. Add 7 kg CaO into the NO. 1 solution, and stir them to get the CaO suspension.

The 2nd step, prepare the rare earth oxides precursor. Blend the mixture of zirconium oxychloride and yttrium nitrate yttrium chloride with ethanol, heat the solution. Then, add 20 wt % hydrogen peroxide solution into the solution, stir them to get the yttria precursor with concentration of 5 mol/L.

The 3rd step, add the zirconia/yttria precursor into CaO suspension, stir them to get NO. 2 solution. The mole ratio of the zirconium oxychloride, yttrium nitrate, and the CaO is 0.5:0.5:1.

The 4th step, use ammonia water solution to adjust the pH value of NO. 2 solution to 9 to get NO. 3 solution.

The 5th step, dry the NO. 3 solution to get the powders. The condition for drying is 60° C. for 12 hours.

The 6th step, sinter the powders at 1300° C. for 12 hrs. Attain zirconia/yttria-coated CaO powders.

The 7$^{th}$ step, heat the 36.5 kg zirconia/yttria-coated CaO powders, 2.281 kg zirconia, 2.281 kg yttrium, 3.421 kg paraffin wax, 0.913 beeswax and 0.228 kg oleic acid together to 50° C., then stirring them sufficiently to get the CaO-based ceramic cores material.

The 8$^{th}$ step, shape the material and sinter it to produce the CaO-based ceramic cores. Sintering condition is 1100° C.

The room and high temperature bending strength test results of cores are: bending strength at room temperature is 33 MPa, and at high temperature is 10 MPa; at 1500° C., the core deflection is 0.22 mm, 0.43% sintering shrinkage; 49% porosity; Hydration test is operated in a chamber at 26° C. and 98% humidity for 1, 5, 10, 15, 20 days, then weight the ceramic core tablets, record the weight changes.

TABLE 3 the consequence of the hydration test

| time/day | 1 | 5 | 10 | 15 | 20 |
|---|---|---|---|---|---|
| Weight gain rate/% | 0.011 | 0.019 | 0.022 | 0.027 | 0.030 |

From the table 3, the weight gain rate of yttria-coated CaO-based water-resistant ceramic cores after 20 days is only 0.030%, which shows the superior water resistance and meet the requirements for titanium investment casting.

The invention claimed is:

1. A CaO-based ceramic core, consisting materials as follows: 5~15 wt % plasticizer with rare earth oxides-coated CaO powders for balance.

2. The CaO-based ceramic core according to claim 1, further consisting of 0.01~20 wt % mineralizer in the raw material.

3. The CaO-based ceramic core according to claim 2, characterized in that the mineralizers are made of zirconia, yttiria, or zirconia and yttiria mixed in any weight ratio.

4. The CaO-based ceramic core according to claim 1, characterized in that the plasticizer consists of 50~80 wt % paraffin wax, 10~40 wt % beeswax and 5~10 wt % oleic acid.

5. The CaO-based ceramic core according to claim 1, characterized in that the rare earth oxides-coated CaO powders are CaO coated with yttiria, or zirconia mixed with yttiria.

6. A method of making the CaO-based ceramic core according to claim 1, characterized in that the method includes the following steps:
   Step 1: prepare rare earth oxides coated CaO powder;
   Step 2: stirring while heating the rare earth oxides-coated CaO powders with plasticizer to 50~130° C. to make rare earth oxides-coated CaO-based ceramic cores; stirring while heating rare earth oxides-coated CaO powders, plasticizer and mineralizer to 50~130° C. to make rare earth oxides-coated CaO-based ceramic cores;
   Step 3: shaping then sintering rare earth oxides-coated CaO-based ceramic cores with sintering temperature at 1100~1600° C. for 0.5~20 hrs.

7. The method according to claim 6, characterized in that the Step 1 includes the following steps:
   First, prepare the CaO suspension: add the non-ionic surfactant to ethanol to get the mixed solution, make sure every 10 L ethanol contain 0.1~1 kg non-ionic surfactant, add the CaO powder into the solution to form a suspension;
   Second, prepare the rare earth oxides precursor: mix the zirconium oxychloride and inorganic yttrium salt in any percentage to form the rare earth oxides precursor, weigh the zirconium oxychloride and inorganic yttrium salt, put them into the ethanol and heat the solution, then add hydrogen peroxide into the solution, sufficiently stir solution to form the rare earth oxides precursor No 1 solution;
   Third, add the rare earth oxides precursor solution into the CaO suspension, and stir them to attain NO. 2 mixed solution;
   Fourth, add the ammonia water solution into NO. 2 solution to adjust pH value to 8~11, and attain NO. 3 mixed solution;
   Fifth, dry the NO. 3 mixed solution to get the powders;
   Sixth, sinter the powders to get the rare earth oxides-coated CaO powders.

8. The method according to claim 7, characterized in that the non-ionic surfactant mentioned above is PEG, AEO, carbon-rich AEO, Polyoxyethylene fatty acid, Polyoxyethylene amine, or Polyoxyethylene amide.

9. The method according to claim 7, characterized in that the inorganic yttrium salt is yttrium chloride or yttrium nitrate.

10. The method according to claim 7, characterized in that the amount of added $H_2O_2$ is 0.1~0.5 kg per 10 L of the rare earth oxides precursor solution.

11. The method according to claim 7, characterized in that the concentration of rare earth oxides precursor solution is 0.01~22 mol/L.

12. The method according to claim 7, characterized in that in the NO. 2 mixed solution, the mole ratio of rare earth oxides and CaO is 0.005~9.5.

13. The method according to the claim 7, characterized in that the sintering condition in the 6th step is 500~1600° C., for 0.5~20 hrs.

* * * * *